United States Patent [19]

Miller

[11] Patent Number: 4,855,030

[45] Date of Patent: Aug. 8, 1989

[54] DENDRITE INHIBITOR

[75] Inventor: William E. Miller, Naperville, Ill.

[73] Assignee: The United States of America as represented by the United States Department of Energy, Washington, D.C.

[21] Appl. No.: 203,362

[22] Filed: Jun. 7, 1988

[51] Int. Cl.⁴ .................. C25C 7/00; B01D 12/00; C21B 3/04
[52] U.S. Cl. .................... 204/212; 204/225; 204/243 R; 204/245; 210/531; 266/228
[58] Field of Search ............. 204/212, 225, 243 R, 204/250, 244–247, 64 R, 68; 210/221.1, 536, 531, 923; 266/228

[56] References Cited

U.S. PATENT DOCUMENTS

| 813,532 | 2/1906 | Suter et al. | 204/225 X |
| 2,319,402 | 5/1943 | Heuer | 266/228 X |
| 2,349,972 | 5/1944 | Lister | 210/531 X |
| 2,434,105 | 1/1948 | Fleming et al. | 266/228 |
| 2,507,096 | 5/1950 | Dittmer | 204/64 R X |
| 4,032,449 | 6/1977 | De Visser et al. | 210/923 X |
| 4,596,647 | 6/1986 | Miller et al. | 204/212 |

Primary Examiner—Donald R. Valentine
Attorney, Agent, or Firm—James W. Weinberger; Thomas G. Anderson; Judson R. Hightower

[57] ABSTRACT

An apparatus for removing dendrites or other crystalline matter from the surface of a liquid in a matter transport process, and an electrolytic cell including such an apparatus. A notch may be provided to allow continuous exposure of the liquid surface, and a bore may be further provided to permit access to the liquid.

16 Claims, 1 Drawing Sheet

DENDRITE INHIBITOR

CONTRACTUAL ORIGIN OF THE INVENTION

The U.S. Government has rights in this invention pursuant to contract No. W-31-109-38 between the U.S. Department of Energy and the University of Chicago representing Argonne National Laboratory.

TECHNICAL FIELD

The present invention is directed to an apparatus for removing crystalline structures from the surface of a liquid upon which they are growing, and more particularly is concerned with removing such crystalline structures in systems requiring an exposed surface for the growth of crystals, such as in an electrolysis cell.

BACKGROUND OF THE INVENTION

Dendrite or crystal growth on the surface of a liquid is an occurrence well known in the art. However, when such growth occurs in a system requiring the transport of matter to and deposition of matter onto the surface of the liquid itself for dissolution therein, the growth of these solid structures results in a slowing down of transport, and eventually causes a complete shutdown of the matter transport process. Continuing operation of the system requires the removal of the solid dendrites or crystals from the surface of the liquid, a laborious and costly process in most applications.

Additionally, in electrotransport systems, dendrites grow extensively and in an uncontrolled manner into the electrolyte, away from the surface of the liquid, which is a cathode for deposition. This results in a change in the composition of matter deposited on the cathode, since the growth site is at the ends of the dendrites and not at the surface of the liquid. A further problem introduced as a result of this change in growth site is that post-transport separation of the deposited matter and liquid cathode from solidified electrolyte is made considerably more difficult when the dendrites grow into the electrolyte rather than into the liquid cathode. Prevention of dendrite growth into the electrolyte results in a well defined interface between the deposited material/liquid cathode and solidified electrolyte.

A need has developed to provide an apparatus and system which eliminates the inefficiencies and shut down common in previously known transport systems. It is as important to further prevent dendrite growth into the electrolyte. Therefore, it is desirable to remove the crystalline solid from the surface of the liquid while simultaneously allowing matter transportation to the liquid, rather than waiting for matter transport to stop as a result of the dendrite or crystal growth.

BRIEF SUMMARY OF THE INVENTION

The present invention provides an apparatus which can be included in a matter transport system to provide a new and improved system as described above. In particular, the invention allows for the removal of the dendritic or crystalline structures to a subsurface position in the liquid, while simultaneously permitting matter transport to the liquid and deposition on the surface of the liquid. Thus, the dendrites or crystals are efficiently and continuously submerged in the liquid without having to shut the transport system down. System inefficiencies and shutdown as described above are eliminated through use of the present invention and incorporation of the invention into a matter transport system, thereby providing a new and improved system.

An object of the invention is to provide an novel apparatus and system for removing dendritic or crystalline structures from the surface of a liquid to which matter is to be transported while simultaneously permitting the matter transport to occur.

Another object of the invention is to provide an improved apparatus for removing dendritic or crystalline structures from the surface of a liquid cathode in an electrolysis cell. To that extent, it is a further object of the invention to provide an apparatus constructed from an electrically insulating material.

Still another object of the invention is to provide a novel apparatus having a longitudinal axial bore in the apparatus for the insertion of electric power means into a liquid cathode when the apparatus is used in an electrolysis cell.

It is also an object of the invention to provide an electrolysis cell having a liquid cathode and including an apparatus for removing dendritic or crystalline structures from the surface of a liquid to which matter is to be transported, while simultaneously permitting matter transport to occur.

As will become apparent from the following detailed description of the invention and the attached drawings, a variety of advantages are provided by the present invention.

DETAILED DESCRIPTION OF THE INVENTION

Figure 1:
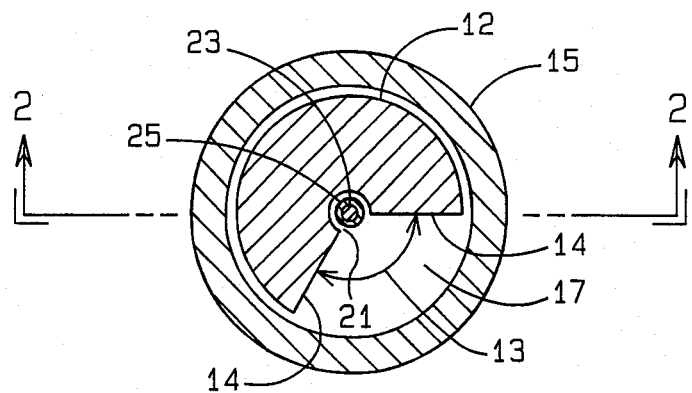
FIG. 1 is a top view of an apparatus and system which embodies the present invention.
Figure 2:
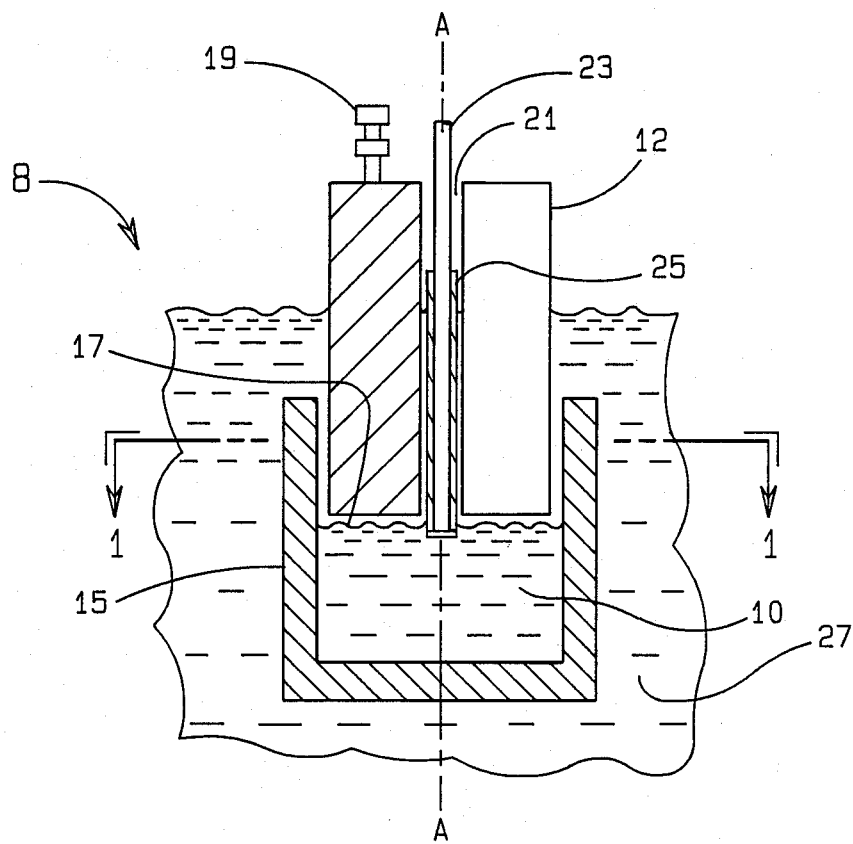
FIG. 2 is a sectional view along line II—II of FIG. 1.

Referring now to the drawings, FIG. 2 shows a sectional view of one embodiment of a dendrite inhibitor system and apparatus 8. Within a liquid 10, in and upon which dendrites or other crystalline structures are forming, a vertically disposed shaft 12 is provided such that shaft 12 is of such size to fill container 15 holding liquid 10. Shaft 12 is notched, as illustrated in FIG. 1. Thus in the illustrated embodiment of FIG. 1, shaft 12 is shown as a circular cylinder having a notch 13, preferably a pie-shaped wedge, removed. Notch 13 is defined, as illustrated, by side walls 14 and container 15 which form the boundaries of the notch. It will be appreciated by those skilled in the art that a variety of shaft and notch configurations are possible, depending on the particular transport system being used. Such shafts include, but are not limited to cylinders, rectangles, squares, ovals and the like. Such notches include, but are not limited to, pie shaped wedges of various sizes, rectangular cut-outs, and the like. Notch 13 permits a portion of upper surface 17 of liquid 10 to be exposed for dendrite growth or crystallization to occur on the upper surface.

Shaft 12 is provided with an appliance 19 for connection to means (not shown) for cycling shaft 12 vertically, and rotating the shaft 12 about its longitudinal axis designated by line A—A. The cycling and rotating means are adapted so that shaft 12 is rotated less than three hundred sixty degrees and so that rotation occurs only when the shaft is raised to its maximum vertical displacement from upper surface 17 of liquid 10. The cycling means is further adapted to permit shaft 12 to descend only to upper surface 17 of the liquid 10 and not below the upper surface.

Shaft 12 may further be provided with a longitudinal axial bore 21, hereinafter bore 21. Bore 21 permits an electrode 23 to be inserted through shaft 12 and into liquid 10, such that liquid 10 can be electrically charged and operable as a cathode. In this embodiment, it is preferred that the shaft 12 be made of an electrically insulating material, including, but not limited to, a ceramic material.

Thus, the dendrite inhibitor 8 may be used in an electrolysis cell such as that disclosed in U.S. Pat. No. 4,596,647 which is incorporated by reference herein. U.S. Pat. No. 4,596,647 discloses an electrolytic cell for refining a mixture of materials, the cell including a metallic pot containing a metallic pool at a lower level, a fused salt as the electrolyte at an intermediate level, an anode basket for containing the materials to be processed, and a cathode positioned in the electrolyte. In such an electrolysis cell, the cathode is preferably not made from a solid as disclosed in the '647 patent, but, as illustrated in FIGS. 1 and 2, is rather a liquid metal, such as molten cadmium, disposed inside an electrically insulated crucible or container 15. As further illustrated in FIGS. 1 and 2, an electrode 23, passing through longitudinal axial bore 21, provides liquid cadmium 10 with electrical charge, thereby cathodizing and allowing matter transfer to the liquid. Shaft 12, which is preferably electrically insulating, inhibits dendrite growth on surface 17 of liquid 10 by forcing dendrites growing on the surface to a point below the surface and within the liquid, thus exposing surface 17 for further deposition of matter. In the illustrated embodiment, electrode 23 is provided with electrical insulation 25 for the length which passes through electrolyte 27 and bore 21 into liquid 10, which acts as a cathode as described above.

As an example, dendrite inhibitor 8 would be used in an electrolysis cell having a liquid cathode upon which solute was being deposited for crystallization. The solute would be electrochemically transported from electrolyte 27 to liquid 10 and deposited upon that portion of surface 17 of the liquid exposed by the notch in shaft 12. Shaft 12 would then be cycled upwards by cycling means (not shown) which may include, but are not limited to, a motor. At the maximum vertical displacement of shaft 12 from surface 17 of liquid 10, rotating means may be engaged whereby shaft 12 would be rotated less than 360 degrees. A different portion of surface 17 of liquid 10 is thus exposed, upon which additional solute may be deposited. When shaft 12 is cycled downward to surface 17 of liquid 10, any solid dendrites or crystals on the surface are submerged below the surface within the liquid. Since these dendrites are no longer exposed to the additional material transported to surface 17 of liquid 10, the growth of these dendrites is inhibited. This process is repeated until the deposition of material is completed.

Although a preferred embodiment of the present invention has been illustrated and described, it will be understood that changes and modifications can be made therein without departing from the invention in its broader aspects. Various features of the invention are defined in the following claims.

What is claimed is:

1. An apparatus for removing crystalline structures from the upper surface of a liquid, comprising:

a vertically disposed cylindrical shaft having an outer surface and a longitudinal axis, said outer surface including a notch, said shaft being made of an electrically insulating material;

means for cyclically lowering said shaft to the surface of the liquid and raising said shaft from said surface;

and means for rotating said shaft around its longitudinal axis at such time when said shaft is raised from the liquid surface.

2. The apparatus of claim 1, wherein said electrically insulating material is a ceramic.

3. The apparatus of claim 2, wherein said liquid operates as a cathode.

4. The apparatus of claim 3, wherein said shaft further includes a longitudinal axial bore.

5. The apparatus of claim 2, wherein said shaft further includes a longitudinal axial bore.

6. The apparatus of claim 1, wherein said liquid operates as a cathode.

7. The apparatus of claim 6, wherein said shaft further includes a longitudinal axial bore.

8. The apparatus of claim 1, wherein said shaft further includes a bore.

9. The apparatus of claim 8, wherein said bore is a longitudinal bore.

10. The apparatus of claim 9, wherein said longitudinal bore is a longitudinal axial bore.

11. An electrorefining cell comprising;

a lower molten cadmium pool;

an anode basket disposed within the lower molten cadmium pool;

a molten electrolyte pool disposed upon said lower molten cadmium pool;

a molten cadmium cathode, disposed within the electrolyte pool, including an upper surface, wherein said molten cadmium cathode includes a vertically disposed rotatable shaft including a longitudinal surface notch, means for cyclically lowering said shaft to the upper surface of the molten cadmium cathode and raising said shaft from said upper surface, and means for rotating said shaft less than 360 degrees around its longitudinal axis at such time when said shaft is raised to its maximum vertical displacement from the upper surface of the molten cadmium cathode;

and electrical power means connected to said anode basket and said cathode for providing electrical power to the cell.

12. The electrorefining cell of claim 11, wherein said shaft is made of an electrically insulating material.

13. The electrorefining cell of claim 12, wherein said electrically insulating material is a ceramic.

14. The electrorefining cell of claim 11, wherein said shaft further includes a bore.

15. The electrorefining cell of claim 14, wherein said bore is a longitudinal bore.

16. The electrorefining cell of claim 15, wherein said longitudinal bore is a longitudinal axial bore.

* * * * *